US012671205B2

(12) United States Patent
Chang et al.

(10) Patent No.: US 12,671,205 B2
(45) Date of Patent: Jun. 30, 2026

(54) PLUG CONNECTOR

(71) Applicant: ADVANCED-CONNECTEK INC., New Taipei City (TW)

(72) Inventors: Ming-Yung Chang, New Taipei City (TW); Xin-Fu Liu, New Taipei City (TW); Chao-Hsuan Cheng, New Taipei City (TW)

(73) Assignee: ADVANCED-CONNECTEK INC., New Taipei City (TW)

( * ) Notice: Subject to any disclaimer, the term of this patent is extended or adjusted under 35 U.S.C. 154(b) by 341 days.

(21) Appl. No.: 18/531,031

(22) Filed: Dec. 6, 2023

(65) Prior Publication Data

US 2024/0195113 A1 Jun. 13, 2024

(30) Foreign Application Priority Data

Dec. 7, 2022 (TW) ................................ 111213525

(51) Int. Cl.
*H01R 13/50* (2006.01)
*H01R 13/506* (2006.01)

(52) U.S. Cl.
CPC ....... *H01R 13/506* (2013.01); *H01R 2201/26* (2013.01)

(58) Field of Classification Search
CPC ............ H01R 13/6582; H01R 2103/00; H01R 13/6581; H01R 13/6593
See application file for complete search history.

(56) References Cited

U.S. PATENT DOCUMENTS

| | | | | | |
|---|---|---|---|---|---|
| 5,741,159 | A * | 4/1998 | Wright | H01R 24/50 | 439/63 |
| 6,050,854 | A * | 4/2000 | Fang | H01R 13/6582 | 439/607.17 |
| 8,152,566 | B1 * | 4/2012 | Little | H01R 13/6582 | 439/607.41 |
| 2003/0157836 | A1 * | 8/2003 | Morikawa | H01R 13/6275 | 439/607.41 |
| 2005/0118866 | A1 * | 6/2005 | Abe | H01R 24/40 | 439/578 |
| 2010/0062642 | A1 * | 3/2010 | Zhang | H01R 13/6275 | 439/607.41 |
| 2014/0349514 | A1 * | 11/2014 | Yang | H01R 12/721 | 439/487 |
| 2015/0093936 | A1 * | 4/2015 | Little | H01R 24/64 | 439/607.19 |

(Continued)

*Primary Examiner* — Truc T Nguyen
(74) *Attorney, Agent, or Firm* — MUNCY, GEISSLER, OLDS & LOWE, P.C.

(57) ABSTRACT

A plug connector includes an outer member and an insulated member. The outer member has a receiving groove. One of two ends of the outer member has a mating side, and the other end of the outer member has an assembling side. The outer member includes a mating ring portion, one or more extension portions, and one or more elastic pieces. The mating ring portion is at the mating side. The extension portion, the elastic piece, and the mating ring portion are integrally formed as a one-piece structure. The extension portion extends toward the assembling side from a side end of one side of the mating ring portion, and the elastic piece is bent at an end portion of the extension portion and arranged at a side portion of the extension portion. The insulated member is in the receiving groove.

8 Claims, 7 Drawing Sheets

(56) References Cited

U.S. PATENT DOCUMENTS

| | | | | |
|---|---|---|---|---|
| 2015/0207279 | A1* | 7/2015 | Little | H01R 24/60 439/676 |
| 2015/0303622 | A1* | 10/2015 | Tao | H01R 13/6581 439/607.55 |
| 2015/0380870 | A1* | 12/2015 | Kao | H01R 13/6583 439/607.01 |
| 2016/0064869 | A1* | 3/2016 | Yu | H01R 13/6596 439/607.05 |
| 2017/0070015 | A1* | 3/2017 | Chen | H01R 13/502 |
| 2018/0026410 | A1* | 1/2018 | Tsai | H01R 13/6587 439/607.09 |
| 2023/0163531 | A1* | 5/2023 | Benzin | H01R 13/6582 439/607.01 |

* cited by examiner

PLUG CONNECTOR

CROSS-REFERENCE TO RELATED APPLICATION

This non-provisional application claims priority under 35 U.S.C. § 119(a) to Patent Application No. 111213525 filed in Taiwan, R.O.C. on Dec. 7, 2022, the entire contents of which are hereby incorporated by reference.

FIELD OF THE INVENTION

The instant disclosure relates to a connector, and more particular to a plug connector.

BACKGROUND

For the data transmission within a vehicle, the amount of the data is large, and a high transmission speed is needed. Within a vehicle, data transmission is achieved through the connection of a plug connector and a receptacle connector. For example, during the autonomous operation of the vehicle or during the application of a driver assistance system, data from cameras, sensors, and navigation devices are transmitted within the vehicle.

SUMMARY OF THE INVENTION

A plug connector, known to the inventor, has an outer member, the outer member has a body portion and a mating ring portion, and the mating ring portion is on the side portion of the body portion. A plurality of elastic pieces extends forward from the body portion. The elastic pieces are floating ends and extend toward the mating ring portion from the rear portion of the body portion. The mating ring portion has a folded structure to protect the elastic pieces. The folded structure of the plug connector is complicated and the manufacturing process for the folded structure is thus difficult.

In view of these considerations, one or some embodiments of the instant disclosure provide a plug connector. The plug connector comprises an outer member and an insulated member. The outer member has a receiving groove. One of two ends of the outer member has a mating side, and the other end of the outer member has an assembling side. The outer member comprises a mating ring portion, at least one extension portion, and at least one elastic piece. The mating ring portion is at the mating side. The at least one extension portion, the at least one elastic piece, and the mating ring portion are integrally formed as a one-piece structure. The at least one extension portion extends toward the assembling side from a side end of one side of the mating ring portion, and the at least one elastic piece is bent at an end portion of the at least one extension portion and arranged at a side portion of the at least one extension portion. The insulated member is in the receiving groove.

In some embodiments, the at least one elastic piece comprises a guiding portion and a contact protrusion. The guiding portion is bent toward the mating ring portion, and the contact protrusion is adjacent to the guiding portion.

In some embodiments, the outer member has a slot formed around the at least one extension portion and the at least one elastic piece.

In some embodiments, the outer member comprises a plurality of the extension portions and a plurality of the elastic pieces. Each of the extension portions extends toward the assembling side from the side end of a corresponding one of two sides of the mating ring portion, and each of the elastic pieces is bent at a corresponding one of two sides of the end portion of a corresponding one of the extension portions and arranged at a corresponding one of two sides of the corresponding one of the extension portions.

In some embodiments, the insulated member has a plurality of leaning portions. Each of the leaning portions leans against one end of a corresponding one of the elastic pieces.

In some embodiments, the outer member has a slit at one side of the mating ring portion and at a middle portion of the at least one extension portion.

In some embodiments, the plug connector further comprises a plurality of terminals. The insulated member has a plurality of terminal groove for being assembled with the terminals.

In some embodiments, the plug connector further comprises a tail cap. The outer member is fitted over the tail cap and the tail cap is fitted over the insulated member.

In some embodiments, the outer member comprises a buckling portion, the tail cap has an engaging portion, and the buckling portion is engaged with the engaging portion.

According to some embodiments of the instant disclosure, the mating ring portion is a tubular structure without a folded structure. Therefore, the manufacturing difficulty of the plug connector can be reduced. Moreover, in some embodiments, through the configuration of the at most four elastic pieces at the upper side and the lower side of the outer member, the plug connector can stably contact a mating receptacle connector.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
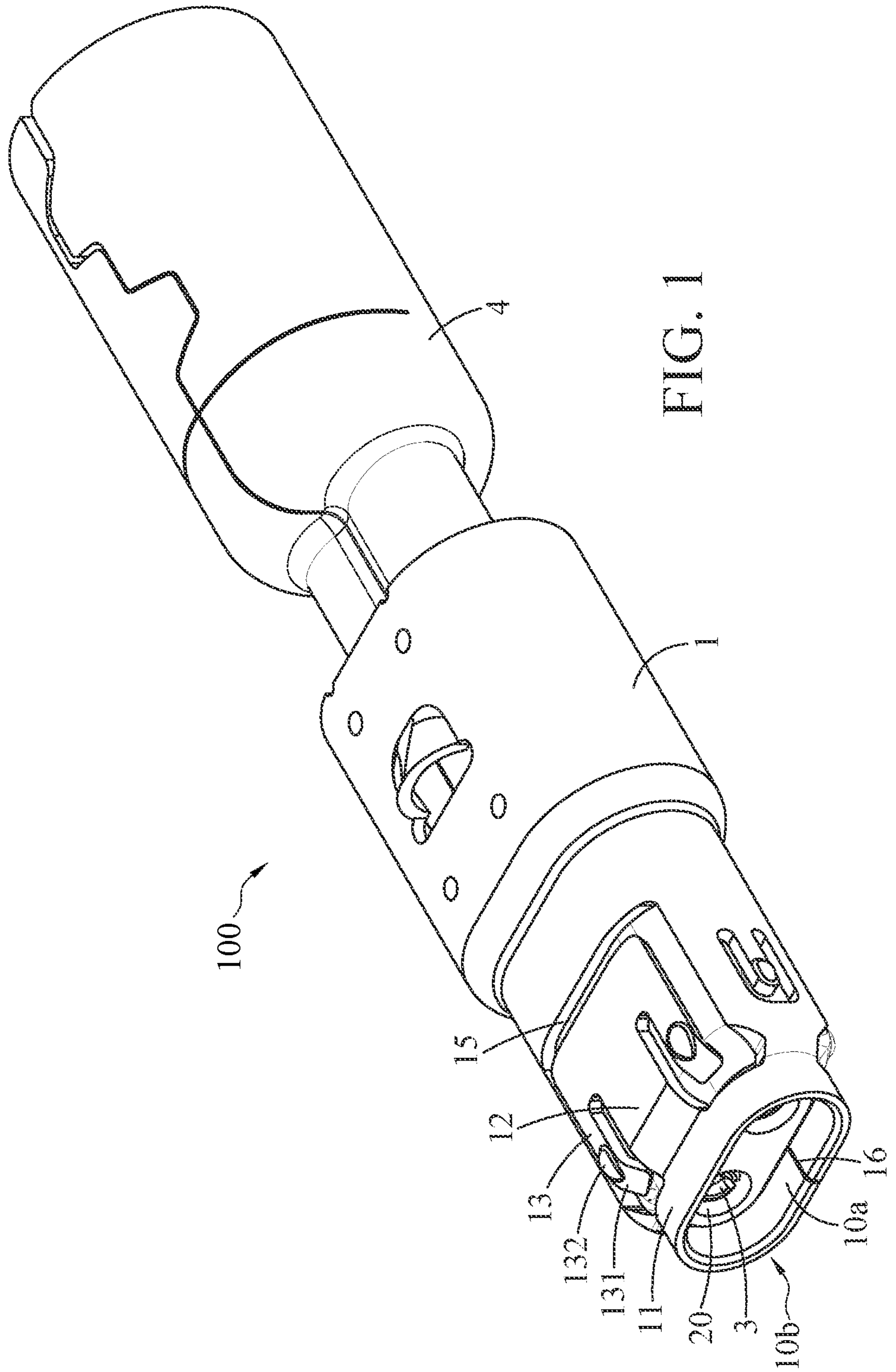
FIG. 1 illustrates a perspective view of a plug connector according to some embodiments of the instant disclosure.
Figure 2:
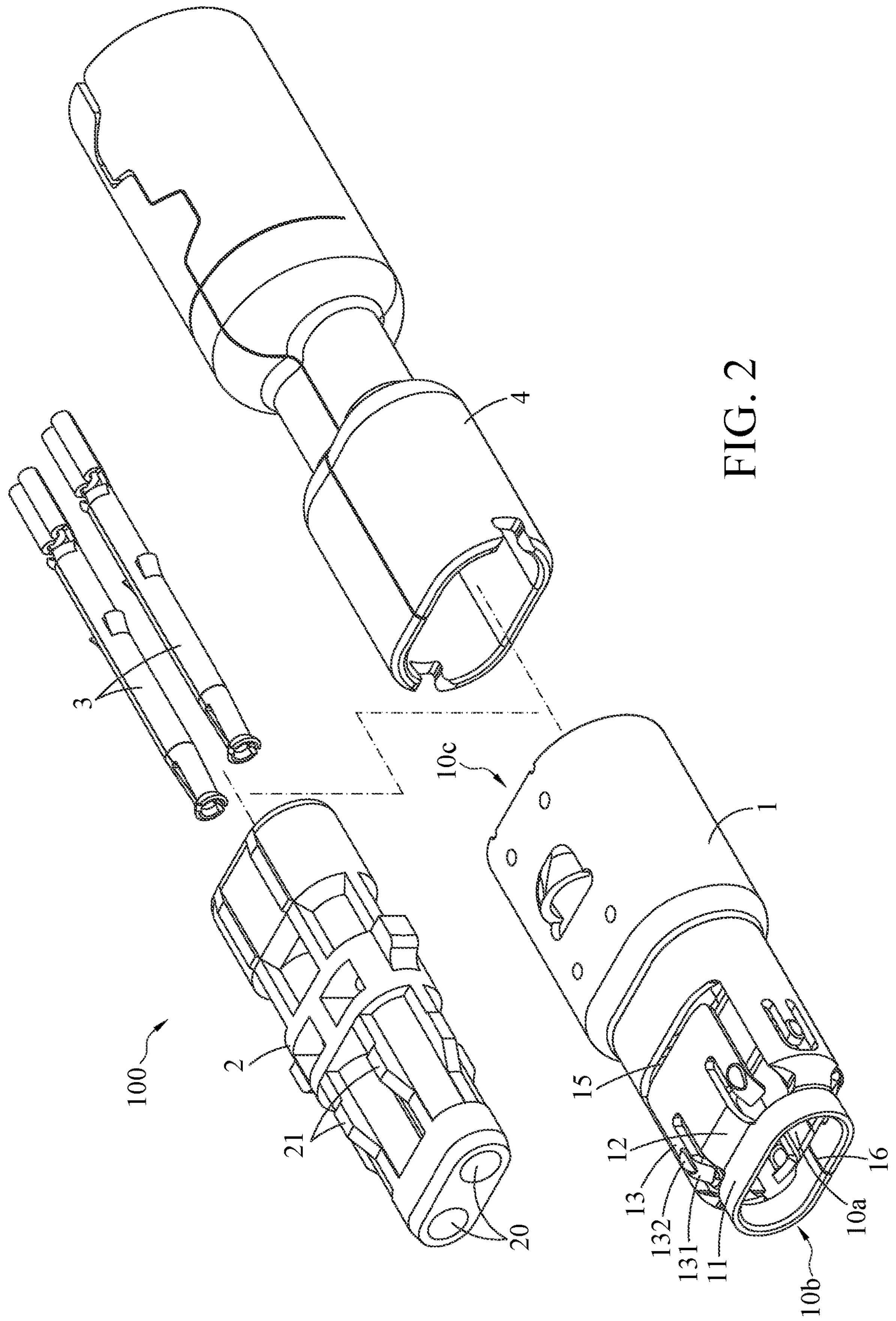
FIG. 2 illustrates an exploded view of the plug connector according to some embodiments of the instant disclosure.

Please refer to FIG. 1 and FIG. 2. FIG. 1 illustrates a perspective view of a plug connector 100. FIG. 2 illustrates an exploded view of the plug connector 100. In some embodiments, the plug connector 100 is provided as an automotive ethernet connector and is for data transmission between electronic devices (e.g., antennas, radars) of a vehicle. The electronic devices are connected to each other through the plug connector 100 and a receptacle connector which are mated with each other and respectively connected to cables. The plug connector 100 comprises an outer member 1 and an insulated member 2. The insulated member 2 comprises a plurality of terminal grooves 20 for being assembled with a plurality of terminals 3. In some embodiments, the insulated member 2 may comprise one terminal groove 20 for being assembled with one terminal 3. In some embodiments, the plug connector 100 further comprises a tail cap 4. The outer member 1 is fitted over the tail cap 4, and the tail cap 4 is fitted over the insulated member 2. In some embodiments, the tail cap 4 and the outer member 1 are assembled with each other through laser welding. Moreover, in some embodiments, a cable may be assembled in the tail cap 4.

Figure 3:
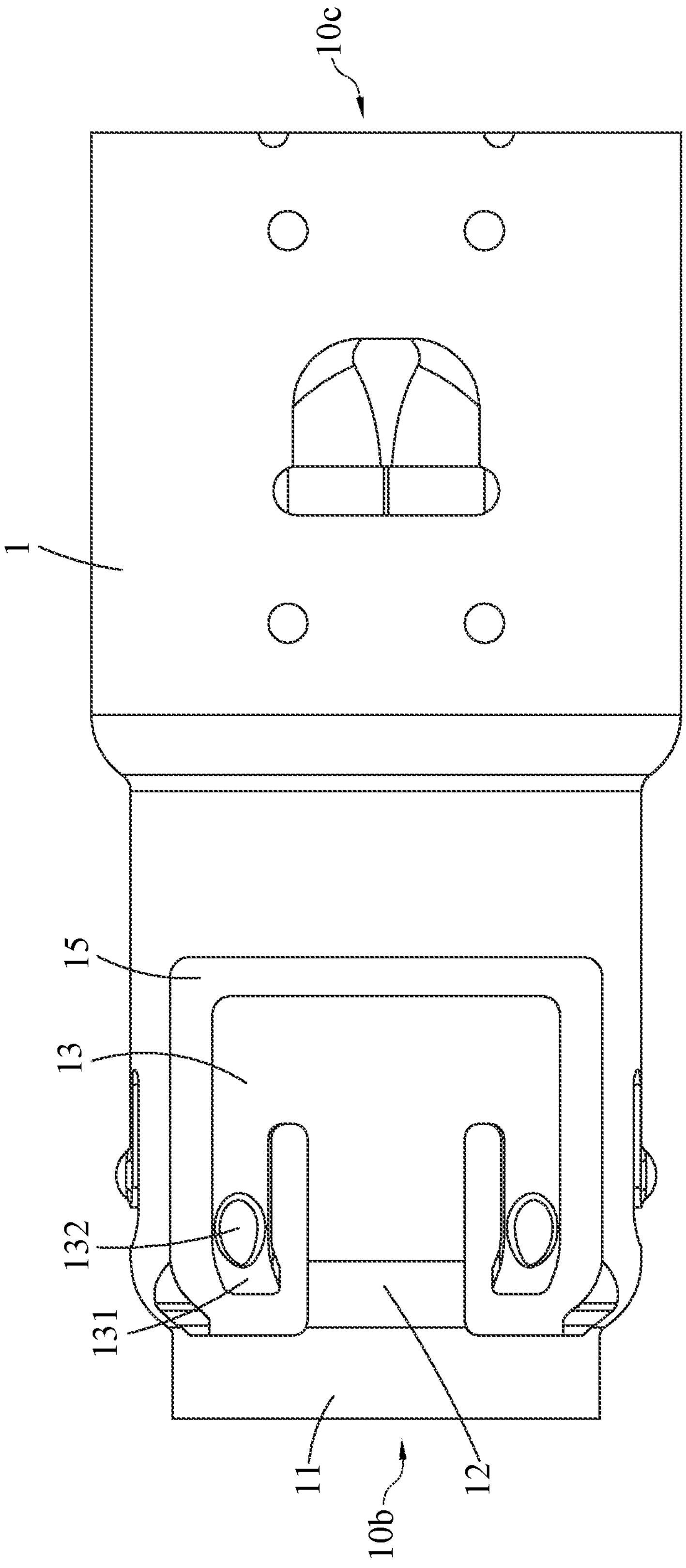
FIG. 3 illustrates a top view of an outer member according to some embodiments of the instant disclosure.

Please refer to FIG. 2 and FIG. 3. FIG. 3 illustrates a top view of an outer member 1. The outer member 1 has a receiving groove 10*a*, and the insulated member 2 is in the receiving groove 10*a*. One of two ends of the outer member 1 has a mating side 10*b*, and the other end of the outer member 1 has an assembling side 10*c*. The outer member 1 comprises a mating ring portion 11, at least one extension portion 12, and at least one elastic piece 13. The mating ring portion 11 is at the mating side 10*b*. The at least one extension portion 12, the at least one elastic piece 13, and the mating ring portion 11 are integrally formed as a one-piece structure. The at least one extension portion 12 extends toward the assembling side 10*c* from a side end of one side of the mating ring portion 11. The at least one elastic piece 13 is bent at an end portion of the at least one extension portion 12 and arranged at a side portion of the at least one extension portion 12.

Figure 4:
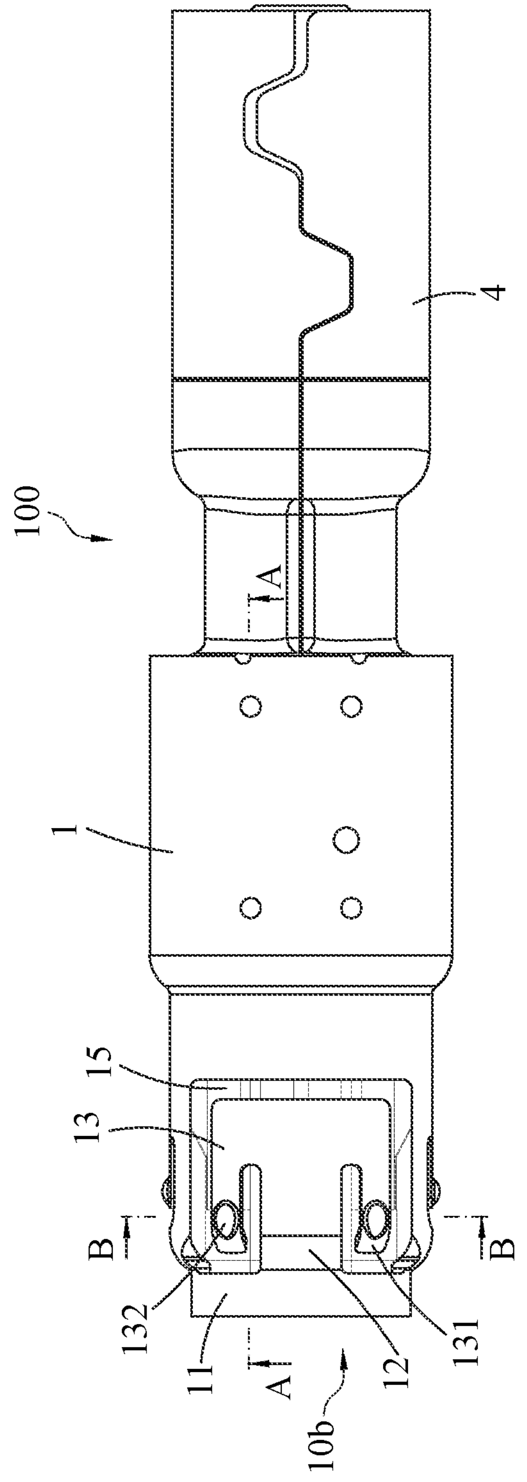
FIG. 4 illustrates a top view of the plug connector according to some embodiments of the instant disclosure.
Figure 5:
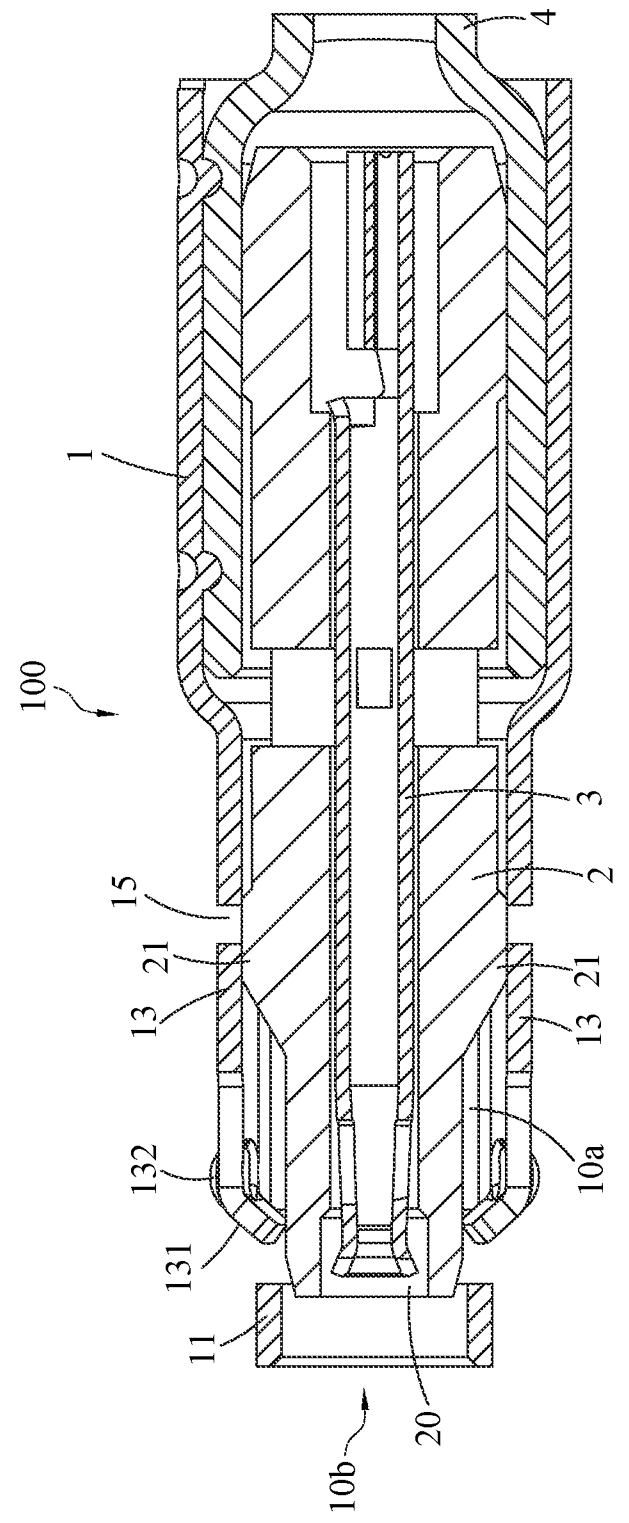
FIG. 5 illustrates a cross-sectional view along the line A-A shown in FIG. 4.
Figure 6:
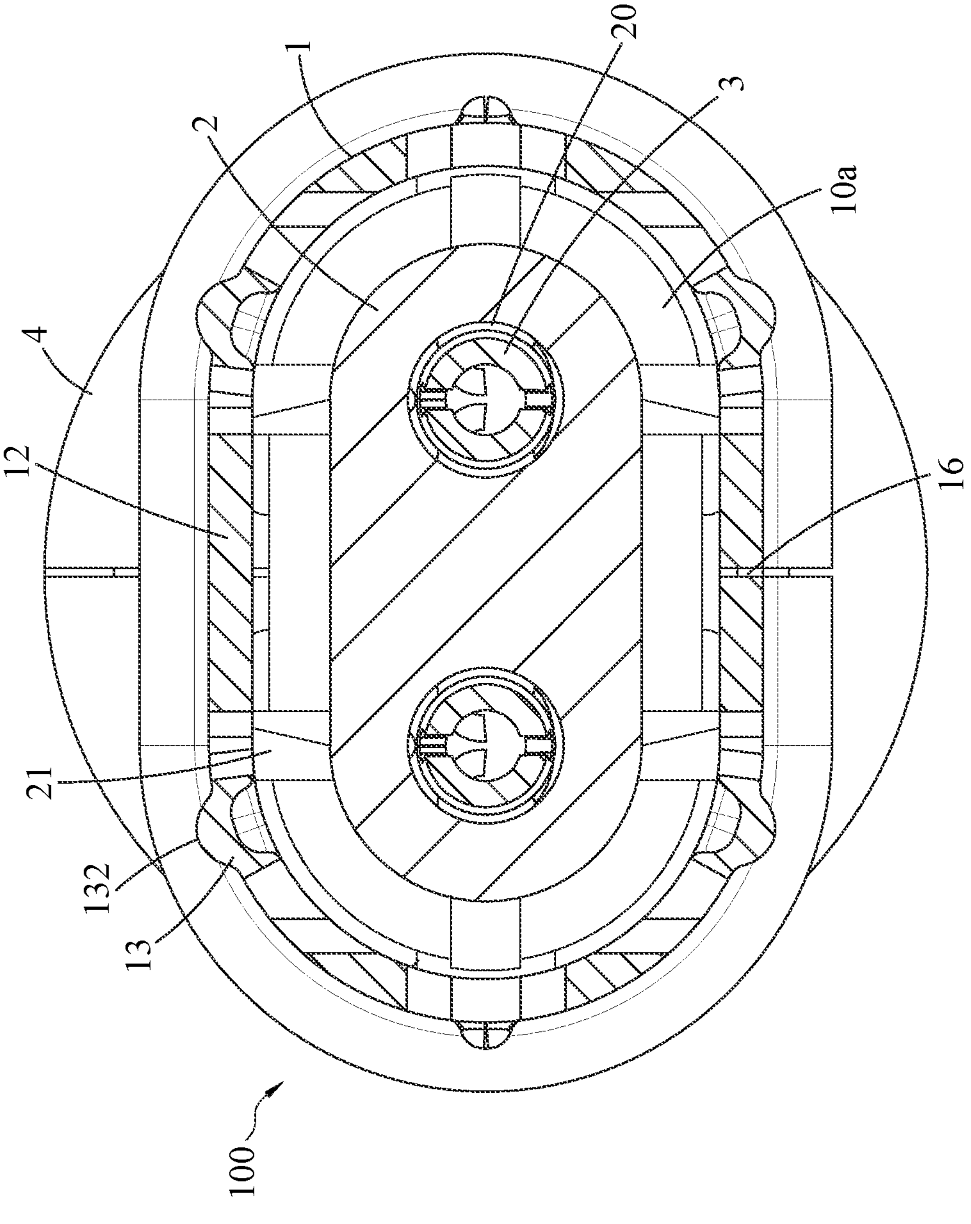
FIG. 6 illustrates a cross-sectional view along the line B-B shown in FIG. 4.

Please refer to FIG. 2 to FIG. 5. FIG. 4 illustrates a top view of the plug connector 100. FIG. 5 illustrates a cross-sectional view along the line A-A shown in FIG. 4. FIG. 6 illustrates a cross-sectional view along the line B-B shown in FIG. 4. In some embodiments, the outer member 1 comprises a plurality of extension portions 12 and a plurality of elastic pieces 13. Each of the extension portions 12 extends toward the assembling side 10*c* from the side end of a corresponding one of two sides of the mating ring portion 11 (for example, the upper side and the lower side of the mating ring portion 11 shown in FIG. 2). Each of the elastic pieces 13 is bent at a corresponding one of two sides of the end portion of a corresponding one of the extension portions 12 and arranged at a corresponding one of two sides of the corresponding one of the extension portions 12. In some embodiments, a combination of two elastic pieces 13 and one extension portion 12 are substantially formed as an E-shaped structure.

In some embodiments, the mating ring portion 11 is provided with one extension portion 12 at only one side of the mating ring portion 11 (for example, at the upper side or the lower side of the mating ring portion 11 shown in FIG. 2). In some embodiments, the mating ring portion 11 is provided with two extension portions 12 at only one side of the mating ring portion 11 (for example, at the upper side or the lower side of the mating ring portion 11 shown in FIG. 2). Specifically, in some embodiments, two elastic pieces 13 are between the two extension portions 12, and each of two adjacent elastic pieces 13 respectively extends and bends at an end portion of a corresponding one of the extension portions 12, and the two adjacent elastic pieces 13 are arranged at a middle portion between the two extension portions 12.

Please refer to FIG. 2 to FIG. 6. In some embodiments, the outer member 1 is a plate member and is cut to form the mating ring portion 11, the extension portion 12, and the elastic pieces 13. The outer member 1 has a slot 15 formed around the extension portion 12 and the elastic pieces 13. Then, the plate member is processed to be the outer member 1 having a hollowed tubular structure.

Please refer to FIG. 2 and FIG. 6. In some embodiments, after the outer member 1 is processed to be a tubular structure, the outer member 1 has a slit 16, and the slit 16 is at one side of the mating ring portion 11 (for example, the lower side of the mating ring portion 11 shown in FIG. 2) and a middle portion of the extension portion 12 at the lower side of the mating ring portion 11.

In some embodiments, when the plug connector 100 is mated with a receptacle connector, the elastic pieces 13 on the outer member 1 can stably contact the receptacle connector. Furthermore, in some embodiments, through the configuration of the at most four elastic pieces at the upper side and the lower side of the outer member, the plug connector can stably contact a mating receptacle connector thus meeting the product requirements.

Please refer to FIG. 2 and FIG. 6. In some embodiments, the elastic piece 13 comprises a guiding portion 131 and a contact protrusion 132. The guiding portion is bent toward the mating ring portion 11, and the contact protrusion 132 is adjacent to the guiding portion 131. In some embodiments, in the case that the elastic pieces 13 are warped upward caused by processing tolerance, when the plug connector 100 is mated with the receptacle connector, the guiding portion 131 can firstly contact the receptacle connector to guide the receptacle connector to be oriented at a correct mating orientation, so that the plug connector 100 can be mated with the receptacle connector properly. Therefore, the issue of the deformation of the elastic piece 13 when the elastic piece 13 is not in the normal position (the unwarped state is the normal position) and contacts the receptacle connector can be prevented. Moreover, in some embodiments, if the plug connector 100 is mating with the receptacle connector crookedly, the guiding portion 131 can firstly contact the receptacle connector to guide the receptacle connector to be oriented at a correct mating orientation, so that the plug connector 100 can be mated with the receptacle connector properly.

In some embodiments, the elastic piece 13, the extension portion 12, and the mating ring portion 11 are integrally formed as a one-piece structure. Through the guiding portion 131 for contacting and guiding the receptacle connector, the mating ring portion 11 can be devoid of folded structures (which are provided for protecting the elastic pieces 14). Moreover, in some embodiments, the mating ring portion 11 is a tubular structure and thus the manufacturing difficulty of the outer member 1 can be reduced.

Please refer to FIG. 2 and FIG. 6. In some embodiments, the insulated member 2 has a plurality of leaning portions 21, and each of the leaning portions 21 leans against one end of a corresponding one of the elastic pieces 13 (a turning portion between each of the elastic pieces 13 and a corresponding one of the extension portions 12). When the plug connector 100 is mated with the receptacle connector, the elastic piece 13 performs an elastic swinging movement by taking the leaning portion 21 as a fulcrum.

Figure 7:
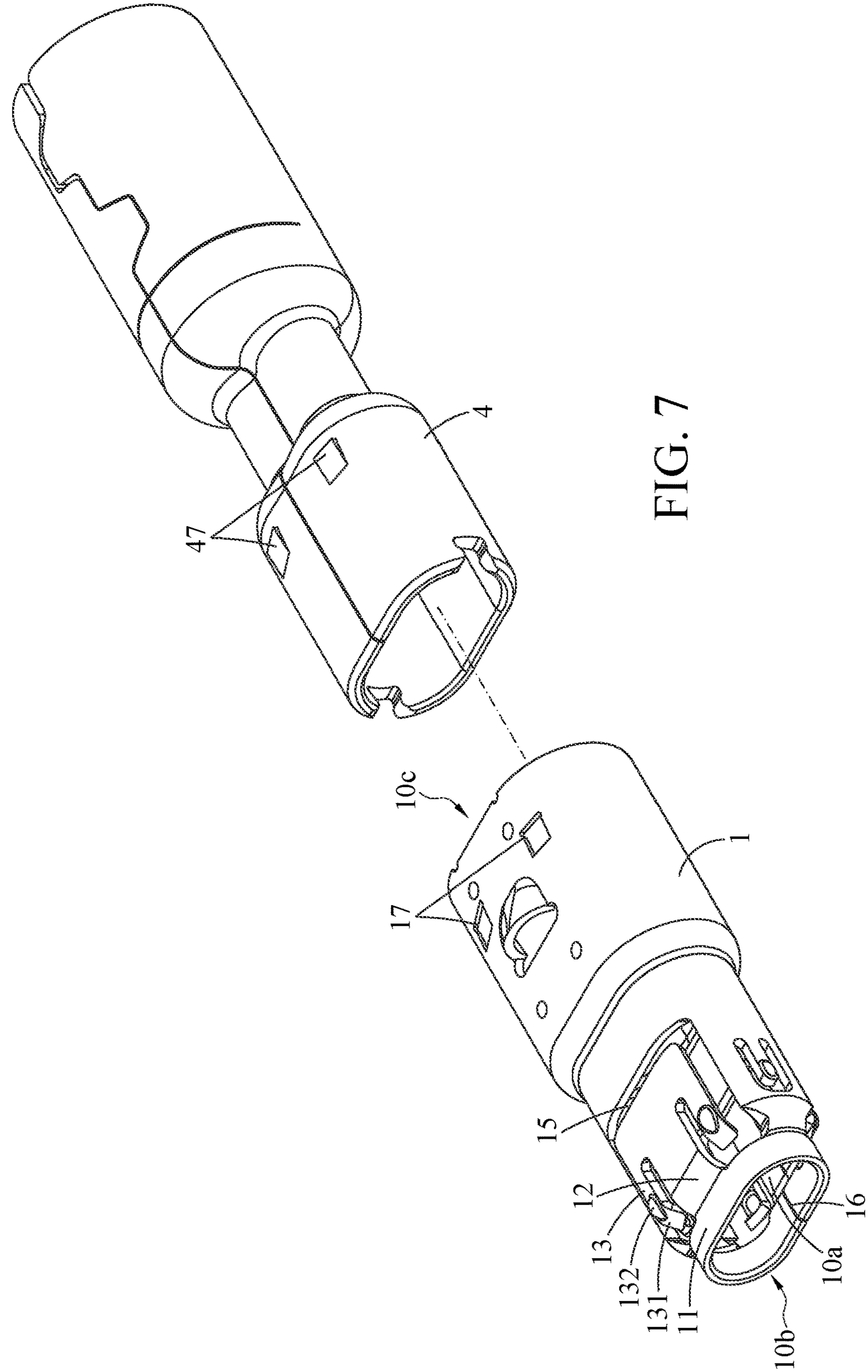
FIG. 7 illustrates a perspective view of the outer member and a tail cap according to some embodiments of the instant disclosure, where the outer member comprises a buckling portion and the tail cap comprises an engaging portion.

Please refer to FIG. 7. FIG. 7 illustrates a perspective view of the outer member 1 and a tail cap 4. In some embodiments, the outer member 1 comprises a plurality of buckling portions 17 (or may be one buckling portion 17 in some other embodiments), and the tail cap 4 comprises a plurality of engaging portions 47 (or may be one engaging portion 47 in some other embodiments). When the tail cap 4 is mated with the assembling side 10*c* of the outer member 1, the buckling portion 17 of the outer member 1 is engaged with the buckling portion 47 of the tail cap 47. Therefore, the outer member 1 and the tail cap 4 can be closely mated with each other. Such configuration can cooperate with automated production and thus the stability of the assembled structure can be enhanced. In some embodiments, the buckling portion 17 of the outer member 1 is a groove, and the engaging portion 47 of the tail cap 4 is a hook structure, but the instant disclosure is not limited thereto. In some other embodiments, the buckling portion 17 of the outer member 1 may be a hook structure, and the engaging portion 47 of the tail cap 4 may be a groove.

According to some embodiments of the instant disclosure, the mating ring portion is a tubular structure without a folded structure. Therefore, the manufacturing difficulty of the plug connector can be reduced. Moreover, in some embodiments, through the configuration of the at most four elastic pieces at the upper side and the lower side of the outer member, the plug connector can stably contact a mating receptacle connector.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A plug connector, comprising:

an outer member having a receiving groove, wherein one of two ends of the outer member has a mating side, and the other end of the outer member has an assembling side, the outer member comprises a mating ring portion, at least one extension portion, and at least one elastic piece, the mating ring portion is at the mating side, the at least one extension portion, the at least one elastic piece, and the mating ring portion are integrally formed as a one-piece structure, the at least one extension portion extends toward the assembling side and directly connected to a side end of one side of the mating ring portion, and the at least one elastic piece is bent at an end portion of the at least one extension portion and arranged at a side portion of the at least one extension portion; and an insulated member in the receiving groove, wherein the at least one elastic piece comprises a guiding portion and a contact protrusion, the guiding portion is bent toward the mating ring portion, and the contact protrusion is adjacent to the guiding portion.

2. The plug connector according to claim 1, wherein the outer member has a slot formed around the at least one extension portion and the at least one elastic piece.

3. The plug connector according to claim 1, wherein the outer member comprises a plurality of the extension portions and a plurality of the elastic pieces, each of the extension portions extends toward the assembling side from the side end of a corresponding one of two sides of the mating ring portion, and each of the elastic pieces is bent at a corresponding one of two sides of the end portion of a corresponding one of the extension portions and arranged at a corresponding one of two sides of the corresponding one of the extension portions.

4. The plug connector according to claim 3, wherein the insulated member has a plurality of leaning portions, and each of the leaning portions leans against one end of a corresponding one of the elastic pieces.

5. The plug connector according to claim 1, wherein the outer member has a slit at one side of the mating ring portion and at a middle portion of the at least one extension portion.

6. The plug connector according to claim 1, further comprising a plurality of terminals, wherein the insulated member has a plurality of terminal grooves for being assembled with the terminals.

7. The plug connector according to claim 6, further comprising a tail cap, wherein the outer member is fitted over the tail cap and the tail cap is fitted over the insulated member.

8. The plug connector according to claim 7, wherein the outer member comprises a buckling portion, the tail cap has an engaging portion, and the buckling portion is engaged with the engaging portion.

* * * * *